United States Patent [19]

Molliex

[11] 4,183,269

[45] Jan. 15, 1980

[54] RECOVERY DEVICE FOR PARTS FOR AUTOMATIC LATHES OR ANALOGOUS DEVICES

[75] Inventor: Michel Molliex, Thyez-Cluses, France

[73] Assignee: Ardex S.A., Cluses, France

[21] Appl. No.: 908,893

[22] Filed: May 23, 1978

[30] Foreign Application Priority Data

May 31, 1977 [FR] France .................. 77 16562

[51] Int. Cl.² .................. B23B 3/00; B23B 3/36
[52] U.S. Cl. .................. 82/2.5; 82/34
[58] Field of Search .................. 82/2.5, 2.7, 38 R, 34 R

[56] References Cited

U.S. PATENT DOCUMENTS

| 319,542 | 6/1885 | Alger et al. | 82/2.5 |
| 1,788,240 | 1/1931 | Karcevsk | 82/2.5 X |
| 2,331,719 | 10/1943 | Oeschger | 82/2.5 X |

Primary Examiner—Harrison L. Hinson
Attorney, Agent, or Firm—Cook, Wetzel & Egan, Ltd.

[57] ABSTRACT

An automatic device for gently recovering parts upon completion of machining operations as in an automatic lathe. Automatic lathes and other cutting machines generally drop finished parts from the machining area in the absence of custom-designed recovery devices, exposing the parts to damage by falling onto hard surfaces such as other completed parts. The present invention is useful without custom adaptation to a variety of automatic cutting machines. A cushioned shovel extends from a double-acting pneumatic or hydraulic piston beneath the part as its cutting is completed and before the part is dropped from the cutting machine. The shovel retracts and turns on the piston's axis to deposit the part onto a conveyor located away from the cutting machine. Fluid controls govern motion of the piston according to the position of a cam driven by or controlling the operation of the cutting machine.

12 Claims, 3 Drawing Figures

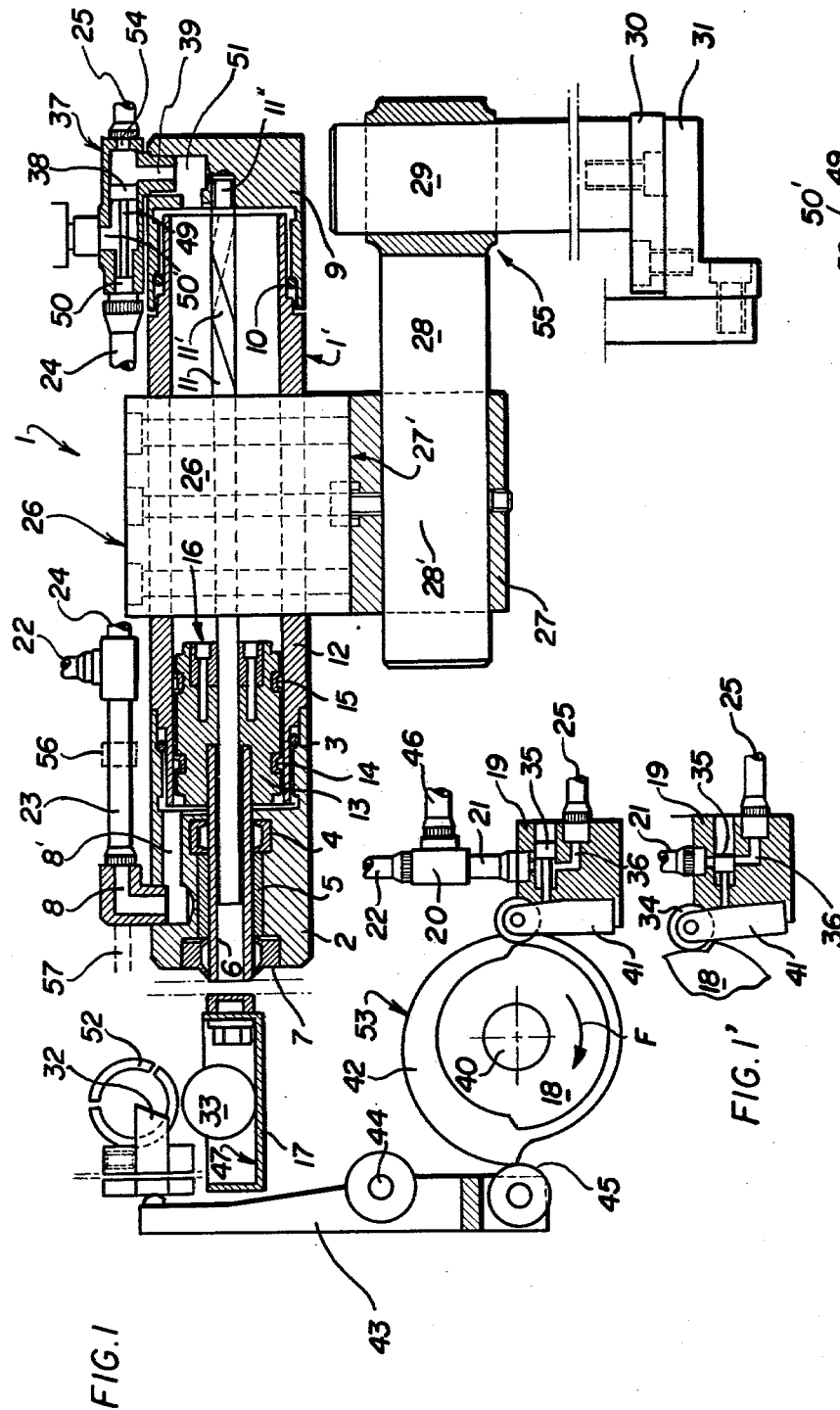
FIG.1
FIG.1'
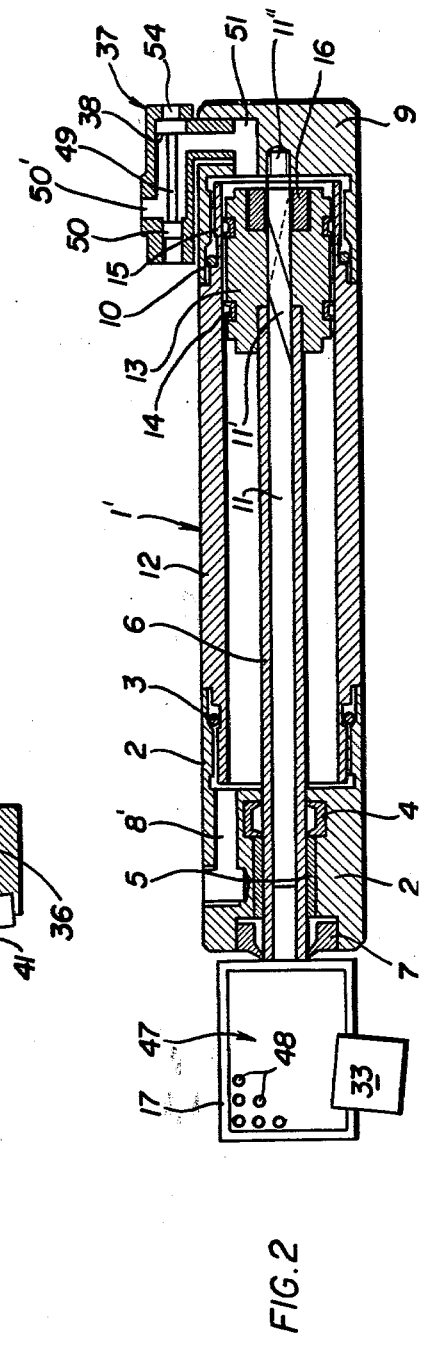
FIG.2

RECOVERY DEVICE FOR PARTS FOR AUTOMATIC LATHES OR ANALOGOUS DEVICES

The present invention relates to a recovery device for parts machined on automatic lathes or similar cutting machines.

It is known that in forming parts, particularly on automatic lathes, the parts, once they are cut or formed, drop by themselves into a receiving container. The parts may impact by the drop against the bottom and walls of the container and against the parts and metal shavings in the container. They may also strike components of the machine. Any such impacts may damage the surfaces of such parts. Marks, streaks and scratches, even though superficial, may render these parts useless for precision mechanics.

Existing devices for elimination of damage to machined parts form integral parts of automatic cutting machines by custom design.

The automatic device according to the present invention is designed and used substantially independently of the cutting machine to which it is attached. The device allows recovery and removal of the parts without any impacts. It also allows simultaneous separation of metallic shavings from cutting operations, thus avoiding sorting and screening operations as required in prior art devices. The invention evacuates the part immediately without damage to a conveyor mat or a ramp separate from the machine and provided for this purpose. Since the device of the invention is orientatable in all phanes and in all directions in attaching to the machine, it is possible to recover even difficult to reach parts held among tools and toolholders of the machine.

The device according to the invention is of simple and rugged design and requires little floor space. It is easily mounted and is highly dependable in its operation, even under difficult working conditions. It may be adapted to and used with most known, conventional automatic lathes and similar automatic cutting machines.

The device of the invention comprises an orientable mounting system by which the device is mounted on the automatic cutting machine. A double action jack has a piston sliding inside a cylinder. The piston carries a shovel which receives the cut parts. Guide means for the piston, carried inside the cylinder, impart on the piston and shovel at the rear end of each stroke a helical or rotational movement about the axis of the piston and shovel to dump each part from the shovel at a desired point. A fluid control system operates the piston and shovel, sequentially and simultaneously with tool spotting means for cutting the parts, under control of a coupling means comprising a pair of cams and cam followers.

The guide means comprise an axial guide rod of polygonal (preferably square) cross section. The rod extends longitudinally through the cylinder and is fixed at its rear end to the rear end of the jack cylinder. The piston longitudinally slides on the guide rod. The rear part of the guide rod is bored or otherwise formed with a helical guide track. A connecting means is formed on or joined to the piston, having an axial opening of the same polygonal section as that of the guide rod. The piston is maintained all along its stroke in a selected angular position by the guide rod. Thus the shovel and piston will be held horizontally during the major part of the piston stroke. At the end or the rear of the stroke, the piston will be tilted laterally to release the collected part from the shovel.

The shovel is fastened to the piston by means of a cylindrical tube which slides in the front end of the jack cylinder in a bronze or other sleeve and over on the guiding rod. Dirt and pressure seals engage the tube at either end of the bronze sleeve.

A pneumatic or hydraulic control system of the jack is operated by a compressed air or pressurized fluid source. An intake valve piston is controlled by a friction roller and a lever positioned by one cam of the coupling means. A differential distributor has an outlet which terminates at a rear port of the cylinder. An inlet of the distributor receives the fluid passed by the intake valve. This distributor has a valve spool having two end faces. Pressure on one face causes the closing of the inlet of the distributor by the other face. However, the other face is larger, so equal pressure on both faces will open the distributor inlet. A middle part of the distribution valve is open to atmosphere or drain to evacuate the rear of the cylinder when the distributor inlet is closed. A further conduit connects the fluid pressure to act on the front side of the piston and also on the smaller face of the differential distributor valve.

The coupling device comprises two coacting cams which may be concentric and coaxial. They are driven by the cutting machine. The friction roller of the intake valve lever bears upon one cam, as by spring pressure. A friction roller of a second hinged lever bears upon the other cam and the advance of the cutting tool. By adjustment of the relative angular positions of the cams, the operation of the cutting tool and the operation of the jack will be synchronized. Thus, after the cut part has been finished and deposited on the shovel, it is moved by retraction of the shovel toward a conveyor mat or a pickup ramp. The part is discharged onto the mat or ramp by lateral inclination of the shovel at the end of the rear stroke of the piston.

The shovel is preferably lined on the inside with a soft coating, as of rough serge, velvet or the like, which can prevent any damage to the surface of parts which it receives. The bottom of the shovel is also preferably perforated with a large number of orifices through which shavings from the cutting machine pass.

The mounting system of the device is fixed directly or indirectly to a frame of the automatic machine and carries a vertical upright member. A horizontal arm is adjustable vertically on the vertical one and is mounted near its top part. An orientable and adjustable support carrier collar is locked on a cylindrical support of the horizontal arm. The jack cylinder is held by two jaws locked on its body and is adjustable laterally on said support carrier collar.

The invention will be understood more fully, and other characteristics and advantages thereof will be shown more clearly, with reference to the following description and the appended drawing, which relate to its preferred embodiment cited as a non-limiting form, example, or embodiment.

In the drawings:

FIG. 1 is a partly longitudinal section of the device in the fully forwardly-advanced position of the shovel.

FIG. 1' shows a changed position of the intake valve and control lever.

FIG. 2 shows the jack and shovel in simplified longitudinal section, the shovel being in retracted position and laterally inclined or rotated.

According to a preferred embodiment of the invention, the automatic device 1 of the invention is carried by an orientable mounting system 55 by which it is mounted or adjacent an automatic lathe or similar cutting machine. The device comprises a double action jack 1'. A piston 13, sliding inside a body or cylinder 12 of the jack forms one piece with a shovel 17 which receives machine-cut parts 33. A guide rod 11 guides the piston 13 inside the cylinder 12, imposing on the piston at the end of the rearward stroke a spiral movement to effect a lateral inclination of the shovel 17. A fluid system is fed from compressed air for actuating the jack 1'. The jack acts sequentially and simultaneously with cutting tool spotting means 32 via a coupling means 53.

Although in one preferred embodiment of the invention, the jack 1' is a pneumatic cylinder using compressed air as fluid, it is also possible to use oil to drive the jack hydraulically.

The jack 1 consists of three parts: a steel body or cylinder 12; a front end 2, a light metal alloy; and a rear end 9, likewise of light metal alloy. The ends are attached by tight screws fastening on both ends of the cylinder 12. The fluid-tightness of these screw fastenings is assured by sealing rings 3 and 10.

The guide rod 11 has a polygonal section, preferably square, which extends longitudinally through the cylinder 12. The rod 11 is carried at a rear end 11'' in the rear cap 9 of the jack 1'. A rear part 11' of the rod 11 has a gimlet or other helical guide back formed in or on it. A connecting means 16, affixed to a rear part of the piston 13, has an opening of the same polygonal section as that of the guide rod 11. Thus the piston 13 is maintained throughout its stroke in selected angular engagement with the rod 11.

The shovel 17 is affixed to the front part of the piston 13 by means of a long cylindrical tube 6. The tube 6 slides in the front end cap 2 of the jack 1', in a bronze bearing 5. A lip seal 4 is arranged in an annular rear groove of said front cap 2 to bear on the tube 6. A dust seal 7 is arranged in a front portion of this front cap 2.

The shovel 17 is lined on its inside with a soft coating 47, as of rough serge, velvet or similar material which can prevent damage to the surfaces of parts 33 it receives from cutting machine. Although provision is made to retract the shovel 17 upon receipt of each cut part 33 prior to the dropping of the cutting shavings, the bottom of this shovel 17 is drilled with a large numer of holes 48 (FIG. 2) through which any shavings falling into the shovel escape.

The hydraulic or pneumatic system, in one form using compressed air for the operation of the jack 1' comprises a single fluid source 46. A connection 20 communicates to a conduit 21 connecting in turn to an intake valve 19. A spool controls fluid passage to a discharge conduit 36. A friction roller 34 and lever 41 engaging a coupling means 53 controls the position of the spool 35. A differential distributor 37 communicates to the discharge conduit 36 of intake valve 19 via conduit 25. A spool valve within the distributor 37 comprises a large-diameter spool 38 at one end, adjacent the outlet of conduit 25, and a smaller-diameter spool 50 spaced by a bar member 49. The distributor 37 is mounted on the rear cap 9 of the jack 1' by an outlet 39 which communicates into a conduit 51 in the cap 9. An inlet 54 to the distributor receives from conduit 25 the fluid passed by the valve 19.

A conduit 22 with two branches 23 and 24 routes fluid from the source 46 via passages 8 and 8' to and through the front end cap 2 of the jack 1'. Inside the cylinder 12 the fluid acts on the front side of the piston 13. The conduit 24 passes fluid to a side of the differential distributor 37 bearing upon the small spool 50. This fluid pressure seals the inlet 54 of the differential distributor 37 via spool 38 upon the closing of valve 19 and via the thrust of the bar 49.

The coupling means 53 comprises two concentric cams 18 and 42 on a common drive shaft 40. A first cam 18 has a periphery on which rides under bias means (not shown) the friction roller 34 of the actuating lever 41 of the piston 35 of the intake valve 19. The second cam 42 has a periphery on which the friction roller 45 of a lever 43 articulated on a shaft 44 bears under bias means (not shown). An upper end of the lever 43 controls the advance of a cutting tool 32 of a chuck locked in the jaws 52 of the automatic cutting machine. It is the chuck from which the machined and cut part 33 is extracted, as in FIG. 1.

Sealing between the front and rear chambers of the cylinder 12 about the piston 13 is assured by two sealing rings 14 and 15 carried on the periphery of the piston 13.

The mounting system of the device 1 comprises a cross-piece 55 mounted on shoulder member 30. The member 30 is fastened in turn on a frame member 31 of the automatic cutting machine. The mount in particular comprises a vertical upright 29 and a selectively positionable and orientable horizontal arm 28 mounted on the top part of such vertical upright 29. An angularly orientable carrier collar 27 is longitudinally adjustable on a cylindrical section 28' of said arm 28. A supporting 26 of the jack 1' has two jaws 26' and 25'' locked onto the body or cylinder 12 of the jack 1' for lateral or swivelable orientation on a plane surface 27' of said support carrier collar 27.

In operation, the shaft 40 of the coupling device 53 is rotated by the automatic lathe or other cutting machine in the direction of the arrow "F". FIG. 1 shows the device 1 in an advanced position, which shovel 17 arranged immediately below the cutting tool 32. The part 33 in said shovel has just been finished. The relative angular positions of the cam 18 and 42 of the device 53 being adjustable suitably as shown, the cam 42, via the friction roller 45 of the lever 43, suddenly releases the cutting tool 32 rearwardly. At the same time the cam 18 releases the lever 41 and retracts the valve spool 35 to the position shown in FIG. 1'. The fluid feed from source 46 to conduit 25, to the inlet 54 of the differential distributor 37, and to the rear of the piston 13 is interrupted. The fluid continues to exert pressure on the front side of piston 13, via conduits 22 and 23, the connection 8 and the conduit 8'. The valve spool 38 in the distributor 37 is moved to the right in FIG. 1, to close the port 54. The piston is forced rearwardly, urgining the unpressurized fluid contained in the rear chamber of the cylinder 12 outwardly via conduit 51, outlet 39, and discharge port 50' of the differential distributor 37 and about the bar 49 of the spool valve. The piston 3 thus fully retracts rearwardly, withdrawing the shovel 17 from beneath the cutting area of the automatic machine.

Near the end of the rearward stroke of the piston 13, the connecting means 16 engages the guide track 11' of the guide rod 11. The guide track imparts a helical movement to the piston 13 and the shovel 17. Such movement controllably releases the cut part 33 as in FIG. 2 to be picked up by an auxilliary conveyor mat or a ramp, not shown.

After the cams 18 and 42 of the coupling means 53 rotate in the direction of the arrow "F" by 180° from the position shown in FIG. 1, the cam 42 gradually causes the tool 32 to advance and to start cutting a new part. The cam 18 returns the spool 35 to the rearward position of FIG. 1, reestablishing fluid communication between conduit 21 and conduit 36. Fluid is thus admitted via conduit 25 to the inlet 54 of the differential distributor 37. Fluid at source pressure is exerted on the larger head 38 of the slide 49. Fluid is also passed at the same source pressure, via conduits 22 and 23 fitting 8, and conduit 8′ to the front face of the piston 13, and also via conduit 24 onto the head 50 of the valve 50-49-38.

Since the face of spool 38 is larger than that of the spool 50, the equal-pressure fluid exerts on the spool 38 a greater force than it exerts on the spool 50. The resultant force returns the slide 49 forwardly, into the position of FIG. 1. The outlet 39 of the differential distributor 37 is opened to allow the fluid in conduit 25 to act against the rear face of the piston 13.

The rear face side of the piston 13 has a larger effective surface than front face, since no pressure is exerted on the front face at the area of the tube 6. Thus the net force on the piston 13 is equal to the surface between the faces times the pressure, or $F = \pi(r_2^2 - r_1^2)P$, where $r_2$ is the outside diameter of the connecting tube 6, $r_1$ is the inside diameter, and P is the source pressure of the activating fluid. The net resultant force causes a relatively slow forward advance of the piston 13 and of the shovel 17.

Thus, starting from the position of FIG. 2, the piston 13 gradually returns to the position of FIG. 1, moving the shove 17 forward. Guided by the guide rod 11, the piston and shovel are moved helically at first, on the rear guide track 11′ of the rod 11. The shovel 17 is thus returned to a horizontal orientation for the major part of its forward stroke and returning to the position of FIG. 1. After the cutting of another part 33, the cycle resumes.

The relatively slow forward movement of the piston 13 positions the shovel 17 gently below and in the immediate proximity of the cutting tool 32. The show speed of such movement of the shovel 17 avoids acumulation of shavings produced during the cutting of part 33 onto the shovel 17.

The tests conducted on pneumatic compressed air prototypes according to the preferred embodiment of the invention just described and shown in the drawing have been completely satisfactory. However, it is possible, as a variation, to provide a supplementary system also controlled by the shaft 40. During the forward movement of the piston 13 and simultaneously with admission of fluid to the rear of the piston 13, the conduit 23 is closed by appropriate devices including for example a shutter 56. Fluid from in front of the piston 13 is released by appropriate means 57 such as a pressure valve or a differential distributor.

When cut pieces of small dimensions are to be cut it may be useful to provide for their feeding hydraulically, expecially by using jack oil as fluid. In such case it is preferable to add the above-mentioned supplementary system and adapt the device for operation by incompressible liquid. Obviously, the speed of the device according to the invention is more rapid the lower the viscosity of the hydraulic fluid used for feeding the jack 1′.

The preferred embodiment of the invention as described and represented in the drawing as well as its variant have been cited only as non-limitative examples. The disclosure will enable the person skilled in the art to apply all changes in shape or detail he considers useful or to replace all or part of the components by equivalents thereof without departing from the scope of the invention thereby.

What is claimed is:

1. An automatic device for recovering parts without surface damage from a cutting machine, the device comprising:

An elongate, closed cylinder having a front and a rear fluid inlet port at each opposite end;

A piston slideable in said cylinder between forward and rearward positions of the piston and extending outwardly from said cylinder at a forward one of said ends;

A shovel affixed to and carried on said forward end of the piston;

Piston guide means within the cylinder for turning the piston and shovel about the longitudinal axis during movement between said forward and rearward positions thereof; and A fluid control means governing the direction of motion of the piston and shovel by selective metering of pressurized fluid to one or both of the cylinder fluid inlet ports in response to operation of the cutting machine.

2. An automatic device as defined in claim 1, further comprising mounting means for affixing the device in a selected position and orientation with respect to the cutting machine.

3. An automatic device as defined in claim 1 or claim 2 wherein the guide means comprise:

A polygonal guide rod situated axially in the cylinder and affixed to the rearward end of the cylinder, A rearward end of the rod having helical guide formed thereon; and A connecting means carried on the piston and engaging the guide rod, the connecting means turning the piston and shovel as it passes about the rearward end of the guide rod, whereby the shovel will be held horizontally in the forward part of its movement and turned on its axis in a rearward part of its movement.

4. An automatic device as defined in claim 3, wherein the guide rod extends to the front end of the cylinder and is in contact with the connecting means throughout the travel of the piston.

5. An automatic device as defined in claim 1, further comprising a cylindrical tube connecting a forward face of the piston and the shovel.

6. An automatic device as defined in claim 5, wherein the forward end of the cylinder is fitted with a bronze bearing sleeve and the tube is sealed to the forward end of the cylinder by an annular lip seal and a scraper seal fitted in the cylinder.

7. An automatic device as defined in claim 1, wherein the fluid control means comprises:

A coupling means driven by the cutting machine during its operation;

An intake valve coupled to a source of said pressurized fluid and having a valve spool operated by said coupling means, the valve spool controlling passage of fluid from an outlet of the valve to the rear inlet of the cylinder;

A differential distributor valve having a cylinder enclosing a slideable piston with a first face exposed to pressure from the intake valve outlet, a second, smaller, opposite face exposed to said pressure source, and a center portion connecting the first and second faces for by-pass of fluid thereabout from the rear part of the cylinder to atmosphere or drain; and At least one conduit intercommunicating said pressure source, said second face of the differential valve, said intake valve inlet, and said front inlet port of the cylinder, whereby when the coupling means directs retraction of the shovel, the intake valve spool shuts off the rear inlet port of the cylinder from the source of pressurized fluid, the differential distributor valve opens the rear inlet port of the cylinder to atmosphere or drain, and the pressure on the forward face of the piston retracts the piston and shovel, and when the intake valve spool opens the rear inlet port to the source of pressurized fluid, the differential distributor valve shifts to block the fluid by-pass and the piston is moved by the greater force on the rearward face toward the extended position.

8. An automatic device as defined in claim 7, wherein the coupling means comprises two concentric cams driven to rotate together by the cutting machine, and wherein:

A lever actuating the valve spool of the intake valve has a member riding on the periphery of the first one of the cams; and The second one of the cams controls linkage means which advance the cutting tool, whereby selective adjustment of the relative angular positions of the two cams synchronizes the operation of the cutting tool and the control of the position and direction of movement of the shovel of the automatic recovery device.

9. An automatic device as defined in claim 1, 7, or 8, wherein the shovel is lined on its upper surface with a soft coating of material which cushions the impact of falling parts being deposited therein.

10. An automatic device as defined in claim 1, claim 7, or claim 8, wherein the bottom of the shovel is perforated with a plurality of orifices through which cuttings which may enter the shovel with the part may drop through the shovel.

11. An automatic device as defined in claim 2, wherein the mounting means comprises a vertical upright connected to a part of the cutting machine, an orientable horizontal arm carried on the vertical upright, and a support carrier collar carried on the horizontal arm and connecting to and supporting the cylinder of the automatic device.

12. An automatic device as defined in claim 7, wherein the conduit communicating said pressure source is said front inlet port of the cylinder carries a valve means for selectively blocking said conduit and a pressure relief valve for communicating the front inlet port of the cylinder to atmosphere or drain.

* * * * *